May 9, 1944.    I. RICHARDSON    2,348,308
LOCK NUT
Filed April 7, 1943
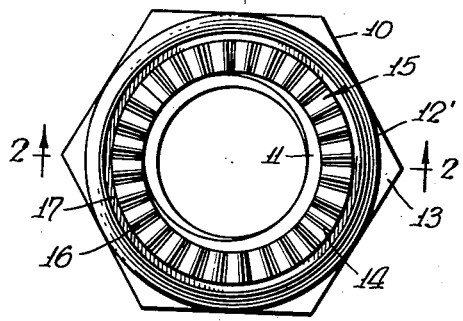
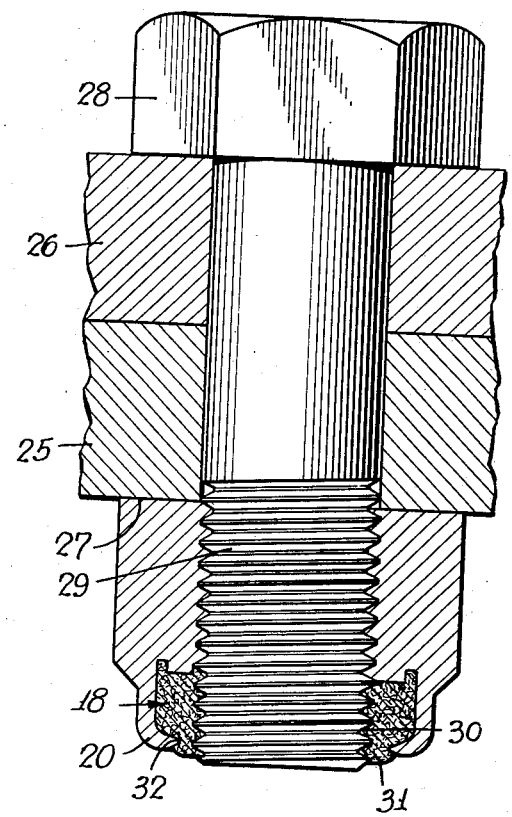
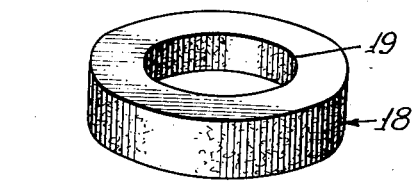
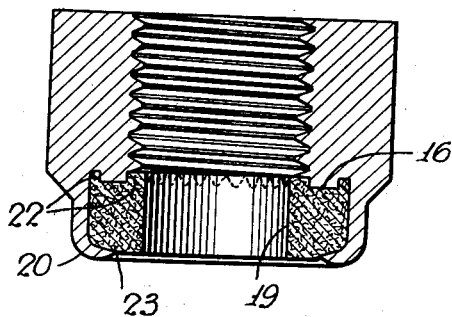
INVENTOR
Irving Richardson
BY
Dean Fairbank & Hirsch
ATTORNEYS Patented May 9, 1944

2,348,308

UNITED STATES PATENT OFFICE 2,348,308

LOCK NUT

Irving Richardson, Newark, N. J.

Application April 7, 1943, Serial No. 482,076

4 Claims. (Cl. 151—7)

The present invention relates to lock nuts of the type in which a yielding washer made a unitary part of the nut assembly serves to take up looseness or vibration in use.

It is among the objects of the invention to provide a nut of the above type of simple and durable construction, which may be fabricated expeditiously and at small expense, and in which the application upon a bolt occurs without the likelihood of severing or loosening the washer from the body of the nut, so that the washer takes a sharp thread impression of the bolt and the nut is thoroughly satisfactory in use.

In the accompanying drawing in which is shown one of various possible embodiments of the several features of the invention, Fig. 1 is a plan view of the nut body of my invention, Fig. 2 is a view in longitudinal cross-section taken on line 2—2 of Fig. 1, Fig. 3 is a perspective view of the washer, Fig. 4 is a view in longitudinal cross-section showing the completely fabricated or assembled lock nut, and Fig. 5 is a view in longitudinal cross-section showing the lock nut as applied in use.

Referring now to the drawing, the nut body which may be of the usual regular polygonal, ordinarily the hexagonal contour 10 and has the usual tapped bore 11, is provided with a coaxial cylindrical socket 12 protruding from one face of the body, which face constitutes the floor 14 of the socket. The circular outer periphery 12' of the socket is desirably inscribed into the regular hexagonal contour of the nut body, so that the sides of the hexagonal body extend substantially tangentially of the projected socket. Oblique shoulders 13 connect the outer wall of the cylindrical socket with the vertex areas of the hexagonal nut. The cylindrical wall of the socket 12 is desirably relatively thin to afford a relatively large inner diameter of socket.

The floor 14 of the socket is desirably flat, that is, in a plane at right angles to the axis of the nut. Said floor is constructed to afford adequate anchorage for the yielding washer to be lodged in the socket. Desirably the anchorage or keying structure comprises a multiplicity of teeth unitary with the socket floor and extending transversely of the periphery thereof. Preferably the structure comprises a concentric ribbed crown 15 made up of identical equally spaced radiating teeth 16 impressed preferably by a die into the floor of the socket. Each tooth of the crown extends substantially the entire width of the annular floor 14 from the tapped bore 11 to near the inner wall of the socket 12. While the crown may have any desired number of teeth, an illustrative practical construction shown has thirty such uniform and equally spaced teeth. At the tapped bore 11, the inner extremities of the radiating teeth 16 making up the toothed crown are at the outer or crest diameter of the thread, as shown. The floor desirably has a narrow peripheral groove 17 sunk therebelow, the outer wall 18 of which is a continuation of the inner socket wall, and the inner wall of which is parallel thereto. This groove serves to assure clean sharp outer extremities to said various radiating teeth 16.

The washer 18 employed according to the present invention may be of any material suitable for the purpose, but is preferably a unitary flat-faced annulus of vulcanized fiber of the type commonly employed for lock nuts. The fiber washer is of outer diameter to fit freely within the socket 12 and of thickness several times the pitch of the thread 11 tapped into the nut body. The bore 19 of the washer is desirably slightly smaller in diameter as shown in Fig. 4, than the inner or root diameter of the tapped bore 11.

The assembly of the nut is desirably completed in a single press operation in which the bevelled rim 20 of the socket is forced inward against the outer face of the washer 18, to compress the latter, and cause its inner or bottom face to take the impression of the entire crown 15 of the socket floor. Thus, as shown in Fig. 4, the entire body of each of the teeth 16 of the crown is forced into the face of the washer, which embeds not only the lateral oblique tooth walls 16' but the inner and outer extremities 22 of the widths of the teeth, as shown. In this press operation, the washer also expands into and fills the peripheral groove 17 in the floor of the nut. If a completed lock nut of the present invention is taken apart, the inner face of the fiber washer will be found permanently to bear the full impression of the crown teeth and peripheral groove. The area of contact between socket floor and washer is thus well over twice the plan area of the floor, affording frictional engagement so effective as to render difficult the operation of prying the washer loose. The multiplicity of radiating ribs 16 act as effective keys to preclude rotary displacement of the washer relative to the nut body.

In the compression of the washer 18 by direct inward punch thrust, the inturned edge 20 of the socket effects compression of the washer chiefly near the outer periphery thereof, to cause the washer to expand peripherally into more secure contact with the upstanding wall of socket 12. The washer suffers no material distortion near its inner periphery, the cylindrical bore 19 of which remains straight.

While it is preferred to assemble the lock nut in a single operation by exerting the crown embedding pressure through, while turning inward the rim 20 of the socket, it will be understood that the washer could be pressed into place by a first operation, which for added security might be followed by a second operation, by which the rim of the socket would then be turned inward over the washer.

In Fig. 5 is illustratively shown a conventional use of the lock nut for pressing two plates 25 and 26 together between the clamping face 27 of the nut and the head 28 of the bolt 29 threaded therethrough. The bolt readily impresses its thread into the cylindrical bore 19 of the washer, as shown at 30. The washer 18 is so securely keyed within the body of the nut by the toothed crown 15 that there is no danger of its coming loose from the socket under the stress of screwing the nut in place. The rotating stress upon the washer as the thread of the bolt forces its way thereinto, is adequately resisted by the keying action of the embedded crown 15. The material displaced by the threaded impression is forced outwardly as a welt 31 that spreads over the thin edge 32 of the inturned rim 20. The nut may readily be removed from the bolt and reused.

As many changes could be made in the above article and method, and many apparently widely different embodiments of this invention could be made without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. A lock nut comprising a tapped body having a coaxial cylindrical socket with a flat floor, keying means rising from said floor, and distributed over substantially the effective area thereof, a unitary yielding washer preassembled in said socket with said keying means embedded therein, the rim of said socket overlapping said washer.

2. A lock nut comprising a body having a cylindrical socket with a flat floor, a plurality of teeth rising from said floor and extending transversely of its circumference, a unitary flexible annular washer preassembled in said socket having said teeth embedded in the under face thereof, the rim of said socket extending inward and overlapping the outer rim of the exposed face of said washer.

3. A lock nut comprising a tapped body having a coaxial cylindrical socket with a flat annular floor, a multiplicity of keying projections unitary with, extending transversely of the circumference of, rising from said flat floor and spaced slightly from the lateral wall of said socket, a yielding annular washer preassembled in said socket embedding and encompassing said keying projections, the rim of said socket overlapping the outer part of the exposed face of said washer.

4. A lock nut comprising a tapped body having a coaxial cylindrical socket with a flat annular floor, a peripheral groove about said floor and sunk therebelow, a multiplicity of teeth unitary with said floor, and rising therefrom, the thickness of each of said teeth extending radially outward from the inner periphery of said annular bottom to said peripheral grove, a fiber washer preassembled in said socket, snugly embedding and encompassing all of said teeth and filling said groove, the rim of said socket overlapping the outer part of the exposed face of said washer.

IRVING RICHARDSON.